March 4, 1952

A. S. VOLPIN 2,587,934

VALVE INDICATOR

Filed Sept. 15, 1947

A. S. VOLPIN
*INVENTOR.*

BY Lester B. Clark
+ Ray L. Smith

*ATTORNEYS*

March 4, 1952     A. S. VOLPIN     2,587,934
VALVE INDICATOR
Filed Sept. 15, 1947     3 Sheets-Sheet 3

A. S. VOLPIN
INVENTOR.

BY Lester B. Clark
    Ray L. Smith
ATTORNEYS

Patented Mar. 4, 1952

2,587,934

UNITED STATES PATENT OFFICE 2,587,934

VALVE INDICATOR

Alexander S. Volpin, Houston, Tex.

Application September 15, 1947, Serial No. 773,984

2 Claims. (Cl. 116—125)

This invention relates to rotatable stem valves and more particularly to rotatable stem valves having indicators associated with the externally extending portion of the stems to visually indicate whether the valves are closed or opened, or the degree of opening thereof.

An object of the invention is to provide a rotatable stem valve which has an indicator associated with the externally extending portion of the stem, which indicator when viewed, will visually indicate whether the valve is closed or opened, or the degree of opening thereof.

A further object of this invention is to provide an indicator coil adapted to be connected at one end with the externally extending portion of the stem of a rotatable stem valve, and adapted to be held at the other end in a stationary position, so that the number of un-coiled spring convolutions and the radially measured distance between convolutions, will visually indicate whether the valve is closed or open, or the degree of opening thereof.

The following disclosure shows the indicator contemplated by this invention adapted to a non-rising, rotatable stem gate valve, but it is obvious that the invention is adapted for use with non-rising, rotatable stem plug valves, and with practically all conceivable types of rotatable stem valves which are so designed that no threaded lengths of valve stem, nor other indicia, are increasingly or decreasingly exposed as the valve is opened or closed. The indicator is also adaptable to rotatable stem valves in general.

Other and further objects of the invention are readily apparent when the following description is considered in connection with the accompanying drawings wherein.

Similar characters of reference are used to indicate similar parts throughout the several views.

Figure 1:
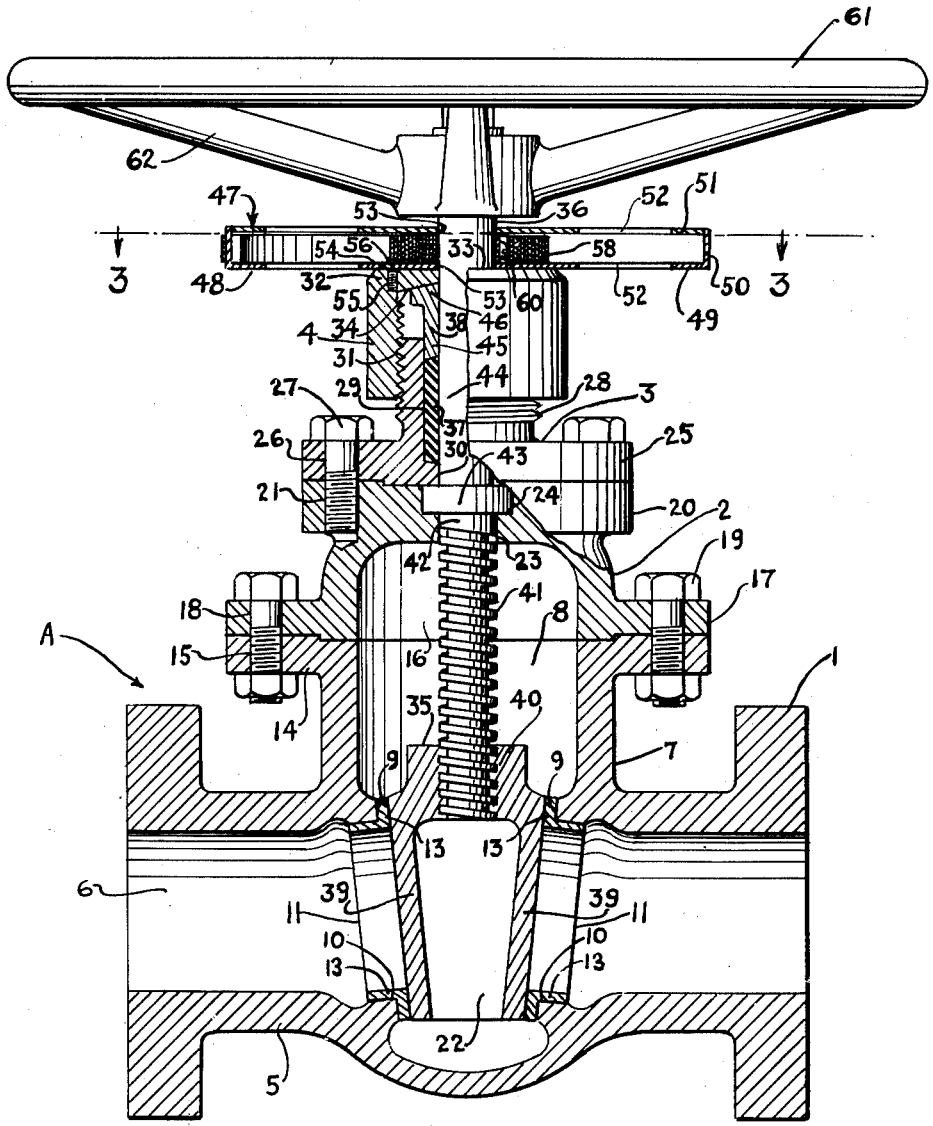
Fig. 1 is a sectional elevation wherein the indicator indicates a gate valve in closed position.
Figure 2:
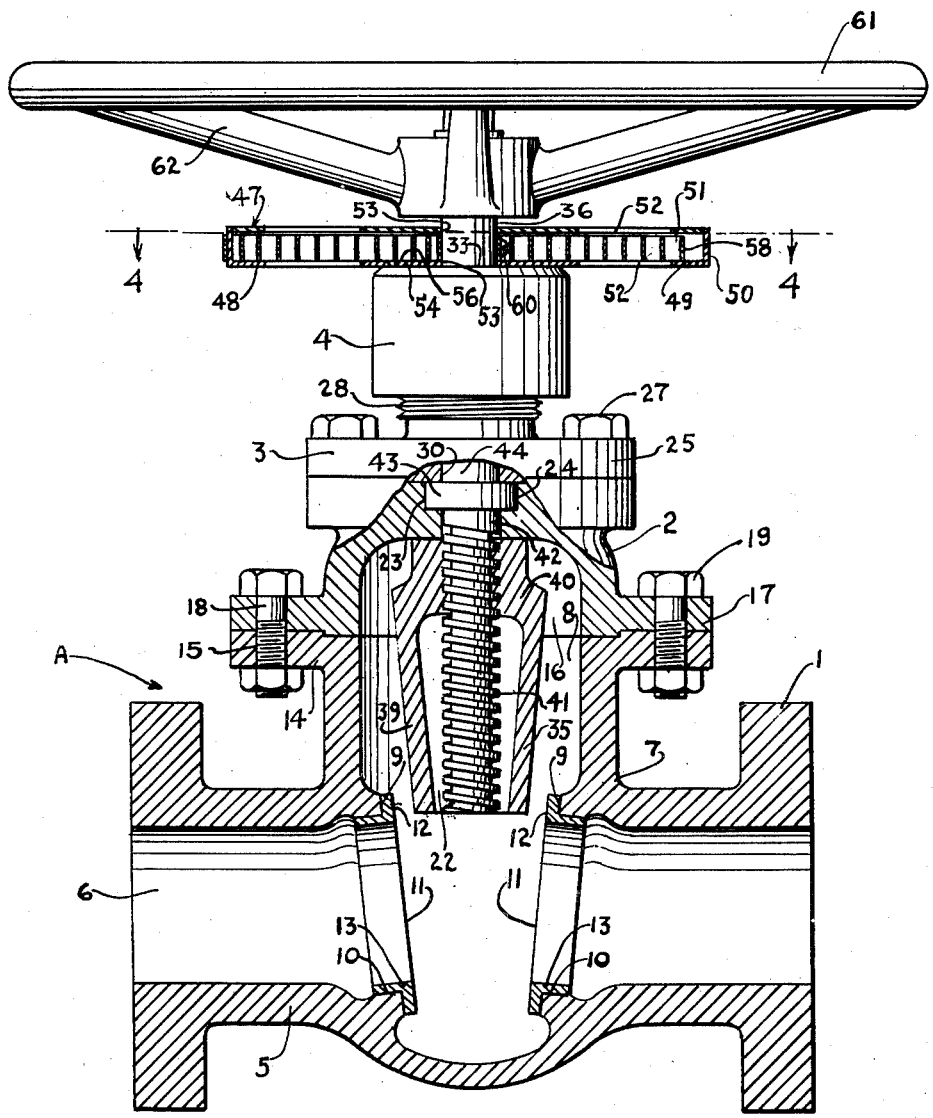
Fig. 2 is a sectional elevation wherein the indicator indicates a gate valve in open position.

The valve has a valve body assembly A which includes the T-section 1, and which also includes a bonnet comprising a lower bonnet 2, an upper bonnet 3, and a gland nut 4. The relationship between these elements will be described herein with reference to the disclosures of Figs. 1 and 2 wherein the T-section constitutes the lowermost element of the assembly, and in which the other elements extend vertically upward therefrom.

The T-section 1 comprises a cross-arm 5 having a substantially cylindrical hole or bore 6 therethrough, and a leg section 7 which also has a substantially cylindrical hole 8 therethrough. The inner surface of the cross-arm 5, at the junction of bores 6 and 8, is formed to provide two annular surfaces 9 which lie in planes extending upwardly and outwardly at equal oblique angles to the axis of cross-arm 5, and this inner surface also provides two annular surfaces 10 formed in the bore 6 of the cross-arm 5 which surfaces 10 intersect, and are perpendicular to the surfaces 9. Two valve seats 11, of more durable material than the T-section 1, are fitted within the cross-arm 5, these valve seats having flange sections 12 designed to fit the annular surfaces 9, and rim sections 13 designed to be pressed snugly inside of, and against surfaces 10. The leg 7 of the T-section has provided at the upper end thereof an annular flange 14 which has threaded holes 15 therein radially spaced from the axis of the leg section.

The lower bonnet 2 has a cored hole 16 in the lower part thereof of the same diameter as the bore 8 in the leg 7, and the lower part of the lower bonnet forms an annular flange 17 of the same diameters as flange 14 of leg 7. This flange has drilled holes 18 therein aligned with drilled holes 15 in flange 14, so that the lower bonnet and T-section can be rigidly connected by means of bolts 19. The lower bonnet also has an upper flange 20 of substantial thickness which has tapped and threaded holes 21 therein radially spaced from the axis thereof. The upper flange 20 has formed therein, extending upwardly axially from the inner surface thereof, first a hole 23 and then a counterbored hole 24 of a larger diameter than hole 23.

The upper bonnet 3 has a flange 25 of the same diameter as upper flange 20 of the lower bonnet 2. This flange has drilled holes 26 therein aligned with threaded holes 21 of upper flange 20 of lower bonnet 2 so that the upper bonnet 3 can be rigidly connected to the lower bonnet 2 by means of cap screws 27. The upper bonnet has an exteriorly threaded shank 28, and the bonnet is axially bored to two diameters, a large counterbore 29 extending through the shank section to terminate in a smaller bore 30 in flange 25.

The gland nut 4 comprises an internally threaded section 31 of dimensions to receive the threaded shank 29 of the upper bonnet 3, and an end wall 32, having a flat top 33 with radially spaced tapped holes 55 therein, an inner surface 34 of conical contour, and a centrally bored hole 46.

Parts working inside the valve body assembly comprise a gate 35, stem 36, packing ring 37, and gland 38.

The gate 35 has beveled side walls 39 designed to fit valve seat flanges 12, a cored opening 22 between the walls 39, and a threaded end 40. The stem 36 has a threaded section 41, an unthreaded length 42 of the same diameter as threaded section 41, a collar 43, and a spindle 44 having a tapped hole 57 near the end thereof. The packing ring 37 has inner diameter to fit around spindle 44 and outer diameter to fit within counterbore 29 of upper bonnet 3. The gland 38 has a shank section 45 with inner diameter to fit around spindle 44 and outer diameter to fit within counterbore 29. The head 46 of the gland 38 is of conical contour to be fitted within the inner surface 34 of gland nut 38.

The indicator assembly, cage, or housing 47 has a drum or cage member 48 comprising a bottom disk 49 and a rim 50 integral therewith, and a top disk 51 of a diameter to fit snugly within the rim 50. The rim 50 has two vertical slots 63 and 62 therein in closely spaced relationship. Both bottom disk 49 and top disk 51 have therein a plurality of fan-shaped, radially spaced openings or perforations 52, of substantial size, and they also have holes 53 centrally thereof. Bottom disk 49 also has therein a plurality of radially spaced drilled and counter sunk holes 54 inwardly of the fan-shaped openings 52. As an indicator, a flat pre-coiled spring 58, of slightly less width than the height of rim 50 is provided, having a hole 59 near the inner end thereof. With top disk 51 removed, the spring can be placed in the drum or cage member 48, and firmly affixed therein by passing the outer end of the coiled spring 58 out through the slot 63 and bending it back in through the slot 62.

In assembly the gate 35 is seated in valve seats 11, lower bonnet 2 is bolted to T-section 1, and the threaded section 41 of stem 36 is inserted through the hole 23 in the lower bonnet and is screwed into gate 35 the full length of the threaded end 40, thus bringing collar 43 to seat in counterbore 24. The upper bonnet 3 is then assembled to lower bonnet 2, packing ring 37 and then gland 38 are slid down around spindle 44 and inside counterbore 29 of the upper bonnet, and finally gland nut 4 is fitted over spindle 44 so that the spindle passes through central bore 46 thereof. The gland nut is then screwed down over threaded shank 29 until inner surface 34 contacts gland 38, and the gland nut is then screwed down still further to tighten the packing around the spindle 44.

The indicator assembly is then rigidly fitted onto the valve body by passing spindle 44 of valve stem 36 upwardly through hole 53 in bottom disk 49, and through the center of coiled spring 58, so that the bottom disk 49 rests on the flat top 33 of the gland nut 4, and may be affixed thereto by means of screws 56. The coiled spring 58 is then spread sufficiently to permit the inner end thereof to be fixed to spindle 44 by passing a screw 60 through hole 59 and screwing it into tapped hole 57 in spindle 44. The top disk is then put on, with spindle 44 passing upwardly through hole 53 therein, and is pushed down so that it fits within rim 50 and over coiled spring 58, and is rotated to align fan-shaped openings 52 therein with the fan-shaped opening 52 of bottom disk 49. Finally a hand-wheel 61 is fitted over and rigidly affixed to the end of spindle 44 in any conventional manner.

In operation, as the hand-wheel 61 is turned to open the valve, the rotation of the threaded section 41 of stem 36 in the threads of gate end 40 causes the gate to move upwardly along threaded section 41, thereby decreasing the obstruction of bore 6 and increasing the degree of opening thereof, so that when the gate has moved up to the point where the gate end 40 is stopped against the inner side of lower bonnet flange 17, the bore 6 is completely opened.

Figure 4:
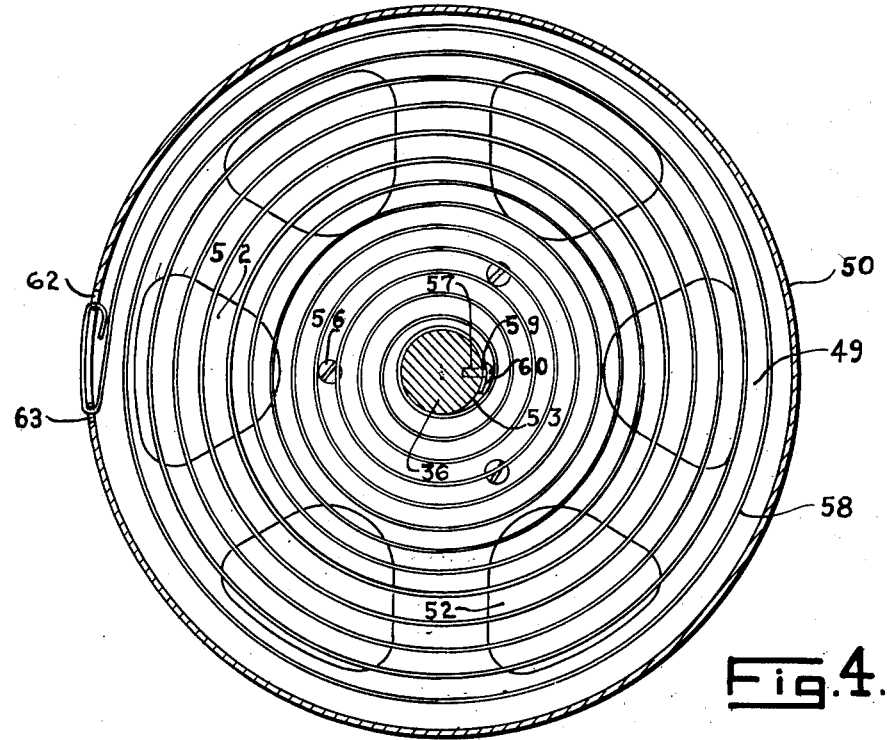
Fig. 4 is a plan view wherein the indicator indicates a valve to be in open position.
Figure 3:
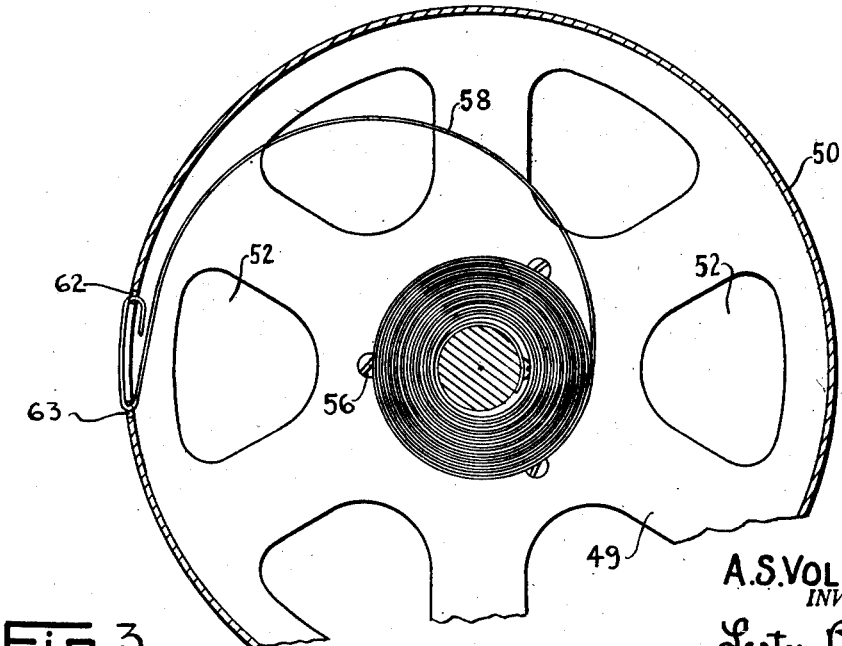
Fig. 3 is a plan view wherein the indicator indicates a valve to be in closed position.

As the valve stem 36 is rotated to open the valve, the coiled spring 58, fixed to the spindle 44 at the inner end, and to the rim 50 of the drum 48 at the outer end, is forced to uncoil against its pre-coiled state, and each revolution of the valve stem opens the coil one convolution. With the spring thus restrained at either end, it is obvious that whether a single convolution or several convolutions have been uncoiled, they add up in extending from the rim periphery to the uncoiled body of the spring with the result that the distance between successive convolutions is greater when there are few uncoiled convolutions, and lesser when there are many. It also occurs that, as more and more convolutions are uncoiled, they tend to extend over the whole surface of the drum. It is consequently apparent that a fully opened valve is indicated by a plurality of uncoiled convolutions with a relatively short radially measured distance between successive convolutions being visible through openings 52, as is shown in Fig. 4, and that a closed valve is indicated by only one partially uncoiled convolution being visible through the openings 52, as is shown in Fig. 3. As the openings 52 are in both top disk 51 and bottom disk 49, the spring 58 is visible therethrough in either coiled or uncoiled state, or in all intermediate stages of uncoiling thereinbetween. The openings 52 are of sufficient number and are of sufficient size so that the visibility of the spring is not overly shrouded by the spokes 63 of hand-wheel 61, and consequently the indicator spring 58 is visible when the valve is viewed from above the hand-wheel. Also, when the valve is installed in a pipe line with stem axis extending at almost any angle to the horizontal or vertical, the spring may be seen through the openings in the top or bottom disk by an observer standing almost anywhere in or near a plane passing through the valve stem axis perpendicular to the T-section axis.

The invention as herein illustrated and described is manifestly subject to many changes in construction and arrangement of parts which will remain within the scope and purpose of the stated objects and appended claims.

What is claimed is:

1. An indicating device comprising a perforated housing adapted for rigid connection to the exterior of the bonnet of a valve body through which bonnet the valve stem passes, and a substantially flat, coiled spring in said housing and visible through the perforations and adapted for rigid association at its outer end with said housing, and with its inner end adapted to be fixed to the valve stem so that the valve stem rotation which actuates the valve element to open and close the valve also varies the number of uncoiled spring convolutions and the perceptible distances between said convolutions to indicate the degree of valve opening or closure.

2. An indicator device for a valve having a body and having a rotatable stem operably engaged to a valve element within the body, said stem extending through said body, said device including an elongated flexible member having at least two ends, means externally of said body for holding one end stationary with relation to said body, the other end being attached to said stem whereby the rotation of said stem operates said valve element and coils and uncoils a substantial length of said flexible member about said stem to visually indicate the open or closed position of said valve.

ALEXANDER S. VOLPIN.

REFERENCES CITED

The following references are of record in the file of this patent:

UNITED STATES PATENTS

| Number | Name | Date |
|---|---|---|
| 630,278 | Wiley | Aug. 1, 1899 |
| 701,155 | Converse | May 27, 1902 |
| 728,286 | Parker | May 19, 1903 |
| 1,994,336 | Dawson | Mar. 12, 1935 |
| 2,140,934 | Dopp | Dec. 20, 1938 |